Patented July 21, 1931

1,815,365

UNITED STATES PATENT OFFICE

JAMES E. SNYDER, OF KENMORE, NEW YORK, ASSIGNOR TO DU PONT CELLOPHANE COMPANY, INC., OF NEW YORK, N. Y., A CORPORATION OF DELAWARE

METHOD OF AFFIXING LABELS

No Drawing. Application filed August 7, 1930. Serial No. 473,755.

This invention relates to the application of labels to various articles and more particularly to a method of affixing the usual gummed labels to articles made from or having a coating including a cellulose derivative, such as cellulose acetate, cellulose nitrate, cellulose ether or the like.

Labels are affixed to articles and packages of all kinds for various reasons. In practice it has been found desirable to have the labels already treated with an adhesive so that, when they are to be affixed to the article, it is only necessary to moisten the adhesive with water and apply the label to the article. The adhesive used on the labels is either of the water-soluble type or one which is capable of becoming tacky on treatment with water. There are numerous articles made wholly or partly of a cellulose derivative. Water will not modify the surface of most cellulose derivatives so as to cause a moistened label to adhere thereto. Therefore, the common method of moistening labels cannot be used in affixing labels to articles composed of such cellulose derivatives.

Recently, a product comprising a transparent, flexible moistureproof film of regenerated cellulose surfaced with a coating containing a cellulose derivative and a wax has come into extensive use as a wrapping material. Inasmuch as the wrapping material has a coating including a cellulose derivative and a wax, the common gummed labels wetted with water cannot be made to adhere to it.

I have found that by using a composition of matter comprising a solution which is immediately capable of causing the adhesive on a label to become tacky and capable of modifying the cellulose derivatives, as by softening, penetrating or partially dissolving it, the label may be securely affixed to the cellulose derivative.

It is therefore an object of this invention to provide a method of affixing gummed labels to materials containing a cellulose derivative and particularly a material such as a sheet or film of regenerated cellulose having a coating including a cellulose derivative and a wax.

Another object of this invention is to provide a method of affixing gummed labels to articles formed of or containing a cellulose derivative wherein a composition of matter comprising a solution capable of rendering the adhesive on the label tacky and modifying the cellulose derivative of the article is applied to the adhesive on the label and/or article.

Another object of this invention is to provide a method of affixing gummed labels to articles formed of or containing a cellulose derivative wherein a composition of matter comprising a solution including a compound which will render the adhesive of the label tacky and soften or partially dissolve the cellulose derivative is applied to the adhesive on the label and/or article.

A further object of this invention is to provide a method of affixing gummed labels to articles formed of or containing a cellulose derivative wherein a composition of matter comprising an aqueous solution of a compound, said compound being a solvent or softener of the cellulose derivative, is applied to the adhesive on the label and/or article.

Other objects will appear from the following description and appended claims.

To attain the above objects a solution capable of rendering the adhesive on the label tacky and modifying the cellulose derivative to permit affixing of the label is necessary. Furthermore, such a solution should possess the following properties:

1. It should be non-toxic.
2. It should not be highly odorous since the wrapping material is frequently used for foodstuffs or other materials capable of absorbing odors.
3. It should be non-tacky.
4. It should be capable of immediately producing a sufficiently tacky surface on the label to insure its immediate adherence to the article.

5. It should cause the label to adhere satisfactorily.

In addition to the above characteristics, when the moistening solution contains two or more liquids it is preferable that each of said liquids have a rate of evaporation approximately equal to the other in order that the composition of the solution be maintained uniform.

I have found that numerous solvents and/or softeners for the cellulose derivative may be formed into a moistening solution by the addition thereto of a substance which will moisten the adhesive of the label. The most common and cheapest substance for rendering the adhesive of the label tacky is water and for this reason aqueous solutions are desirable. When aqueous solutions are employed it is only necessary to incorporate sufficient water to wet the agglutinant on the label and sufficient cellulose derivative solvent or softener to soften the cellulose derivative. Though aqueous solutions are preferable, this invention is not limited thereto since it is possible that non-aqueous solutions may be used.

As above stated, an aqueous solution of a cellulose derivative solvent or softener possessing the desired characteristics will effect a good joint. There is a very large number of cellulose derivative solvents or softeners which, in combination with water, will produce these effects. I, therefore, do not wish to be limited to any specific compound or class of compounds, since it is obvious that precise conditions such as hand labeling, machine labeling, different shapes of articles and labels and other similar conditions will necessitate somewhat different processes and moistening solutions.

In order to more clearly explain this invention, certain specific examples of solutions which have given satisfactory results are hereafter set forth, the proportions being by weight:

| | | | |
|---|---|---|---|
| Diethylene glycol mono ethyl ether | 95% | Water | 5% |
| Ethyl glycollate | 95–30% | Water | 5–70% |
| Ethyl lactate | 90–60% | Water | 10–40% |
| Methyl lactate | 95–60% | Water | 5–40% |
| Ethylene glycol mono ethyl ether | 90–50% | Water | 10–50% |
| Ethylene glycol mono methyl ether | 95–60% | Water | 5–40% |
| Ethylene glycol mono butyl ether | 50–20% | Water | 50–80% |
| Diethylene glycol mono butyl ether | 95–80% | Water | 5–20% |
| Ethylene chlorhydrin | 90–50% | Water | 10–50% |
| Glycerol mono-chlorhydrin | 90–80% | Water | 10–20% |
| Glycerol di-chlorhydrin | 90–80% | Water | 10–20% |
| Tri-ethylene glycol | 90% | Water | 10% |
| Di-ethylene glycol | 95–70% | Water | 5–30% |
| Ethyl methyl ketone | 70% | Water | 30% |
| N-propyl alcohol | 90–60% | Water | 10–40% |
| Isopropyl alcohol | 90–60% | Water | 10–40% |
| Diacetone alcohol | 90–60% | Water | 10–40% |
| Glycol diacetate | 90% | Water | 10% |
| Ethyl oxybutyrate | 70–50% | Water | 30–50% |
| Dioxane | 90–60% | Water | 10–40% |
| Acetone | 82% | Water | 18% |
| Tetrahydrofurfuryl alcohol | 90–80% | Water | 10–20% |

Instead of using binary mixture, a ternary mixture may be used. Several examples of ternary mixtures are as follows:

| | | | |
|---|---|---|---|
| Ethylene glycol mono methyl ether | 60% } 60–40% | Water | 40–60% |
| Ethyl oxybutyrate | 40% | | |
| Ethylene glycol mono ethyl ether | 20–80% } 60–50% | Water | 40–50% |
| Lactic acid | 80–20% | | |
| Ethylene glycol mono butyl ether | 95– 5% } 60–20% | Water | 40–80% |
| Ethyl lactate | 5–95% | | |
| Ethylene glycol mono butyl ether | 95– 5% } 60–20% | Water | 40–80% |
| Ethyl oxybutyrate | 5–95% | | |

Referring to the above specific examples, it will be seen that the solutions comprise water and a cellulose derivative solvent or softener in the proportions of 5% to 80% of the former and 95% to 20% of the latter. In practice I have found that good results are obtained when the binary mixtures contain approximately 40% of water and the ternary mixtures 50% to 80% of water.

The solution may be used in conjunction with ordinary gummed labels to be applied to any material made of or coated with a cellulose derivative. It is capable of being used in affixing labels to the new wrapping material comprising sheets of regenerated cellulose having a coating containing a cellulose derivative and a wax. It is also capable of being used for the application of the ordinary gummed labels on the market to articles formed wholly or partly of a cellulose derivative, as for example, films made from cellulose nitrate, acetate or ethers, as well as to molded or shaped articles composed wholly or partly of various cellulose esters and ethers and other materials which are softened by the moistening solutions above described.

In actual practice the solution is applied to either the adhesive on the label or the article to which the label is to be affixed or both. Subsequently, the label is superposed on the article and pressure applied until the label and the article are united.

The preferred mode of affixing the label utilizes heat in conjunction with the pressure. This procedure is particularly suitable for affixing a label to a package, the wrapper of which is a sheet or film of regenerated cellulose coated or combined with a moistureproofing composition including a cellulose derivative and a wax. Generally, in such packages the wrapping material has a number of folds, particularly at the ends thereof, which ends are sealed and/or decorated by affixing a label thereto. To affix a label to an end of the package according to the preferred method, the surface of the wrapper and the adhesive on the label are rendered tacky or modified as herein set forth and one secured to the other under heat and pressure. The heat and pressure, in addition to quickly and rapidly dissipating the moistening solution, serve to compactly iron down the folds and in many instances heat-seal them. The exact temperature and pressure conditions are not essential for the successful carrying out of the method. The temperature is such that it is capable of dissipating the moistening solution and/or rendering the surfaces of the folds so that they are capable of being united. The pressure need be of such magnitude as will bring the label, the wrapper and/or the surfaces of the folds in intimate contact with each other.

As an alternative method the adhesive on the label may be moistened with water and the cellulose derivative with a suitable modifying agent, such as those herein set forth, after which the label may be secured to the wrapper. In this procedure heat and pressure are also preferably employed.

Though this invention has been specifically described in connection with affixing gummed labels to various articles formed of or containing a cellulose derivative and in particular wrappers consisting of sheets or films of regenerated cellulose coated with a composition including a cellulose derivative and a wax, the invention is not restricted thereto. It is also equally applicable to affixing or joining other gummed materials, such as closures, instruction sheets, paper, cloth, tags attached to a string or ribbon, or the like, to the articles previously mentioned or other materials formed of or containing resins, natural or synthetic, compounded with waxes including sheets or films of regenerated cellulose coated with such resin-wax compositions.

Since it is obvious that various changes may be made in the specific details herein set forth without departing from the spirit of the invention, this invention is not restricted hereto except as set forth in the appended claims.

This application is a continuation-in-part of my application Serial No. 366,089, filed May 25, 1929.

I claim:

1. A method of affixing a gummed material to an article formed of or containing a water-insoluble material which comprises rendering the adhesive on the gummed material tacky, modifying the water-insoluble material and securing said gummed material to said article.

2. A method of affixing a gummed material to an article formed of or containing a water-insoluble material which comprises rendering the adhesive on the gummed material tacky, modifying the water-insoluble material and securing said gummed material to said article under heat and pressure.

3. A method of affixing a gummed material to an article formed of or containing a cellulose derivative which comprises rendering the adhesive on the gummed material tacky, modifying said cellulose derivative and securing said gummed material to said article.

4. A method of affixing a gummed material to an article formed of or containing a cellulose derivative which comprises rendering the adhesive on the gummed material tacky, modifying said cellulose derivative and securing said gummed material to said article under heat and pressure.

5. In a method of affixing a gummed material to an article formed of or containing a water-insoluble material the step of applying to at least one of the materials to be united a solution which will render the adhesive on the gummed material tacky and modify the water-insoluble material.

6. In a method of affixing a gummed material to an article formed of or containing a water-insoluble material the steps of applying to at least one of the materials to be united a solution which will render the adhesive on the gummed material tacky and modify the water-insoluble material, and securing said gummed material to said article under heat and pressure.

7. In a method of affixing a gummed material to an article formed of or containing a cellulose derivative the step of applying to at least one of the materials to be united a solution which will render the adhesive on the gummed material tacky and modify the cellulose derivative.

8. In a method of affixing a gummed material to an article formed of or containing a cellulose derivative the steps of applying to at least one of the materials to be united a solution which will render the adhesive on the gummed material tacky and modify the cellulose derivative, and securing said gummed material to said article under heat and pressure.

9. In a method of affixing a gummed material to an article formed of or containing a cellulose derivative the step of applying to at least one of the materials to be united a solution including an organic compound which will render the adhesive on the gummed material tacky and modify the cellulose derivative.

10. In a method of affixing a gummed material to an article formed of or containing a cellulose derivative the steps of applying to at least one of the materials to be united a solution including an organic compound which will render the adhesive on the gummed material tacky and modify the cellulose derivative, and securing said gummed material to said article under heat and pressure.

11. In a method of affixing a gummed material to an article formed of or containing a cellulose derivative the step of applying to at least one of the materials to be united a composition comprising an aqueous solution of an agent which will modify the cellulose derivative.

12. In a method of affixing a gummed material to an article formed of or containing a cellulose derivative the steps of applying to at least one of the materials to be united a composition comprising an aqueous solution of an agent which will modify the cellulose derivative, and securing said gummed material to said article under heat and pressure.

13. In a method of affixing a gummed material to an article formed of or containing a cellulose derivative the step of applying to at least one of the materials to be united a composition comprising water and a cellulose derivative modifying agent in proportions by weight of 5% to 80% and 95% to 20% respectively.

14. In a method of affixing a gummed material to an article formed of or containing a cellulose derivative the step of applying to at least one of the materials to be united a composition of matter comprising an aqueous solution of a modifying agent of a cellulose derivative, the water comprising approximately 40% by weight of said solution.

15. In a method of affixing a gummed material to an article formed of or containing a cellulose derivative the step of applying to at least one of the materials to be united a composition of matter comprising an aqueous solution of a plurality of modifying agents of a cellulose derivative, the water comprising approximately 50% to 80% by weight of said solution.

16. In a method of affixing a gummed material to an article formed of or containing a cellulose derivative the step of applying to at least one of the materials to be united a composition comprising:

Water ---------------------------------- 40%–80% and 60%–20% of the following composition:

Ethylene glycol mono butyl ether -------- 95%– 5%
Ethyl lactate --------------------------- 5%–95%

17. In a method of affixing a gummed material to an article formed of or containing a cellulose derivative the step of applying to at least one of the materials to be united a composition comprising:

Water ---------------------------------- 5%–40%
Ethylene glycol mono methyl ether ------- 95%–60%

18. In a method of affixing a gummed material to an article formed of or containing a cellulose derivative the step of applying to at least one of the materials to be united a composition comprising:

Water ---------------------------------- 10%–50%
Ethylene chlorhydrin -------------------- 90%–50%

19. A method of affixing a gummed material to a moistureproof material which comprises rendering the adhesive on the gummed material tacky, modifying the surface of the moistureproof material, and securing said gummed material to said moistureproof material.

20. A method of affixing a gummed label to a moistureproof sheet or film of regenerated cellulose which comprises rendering the adhesive on the material tacky, modifying the surface of the moistureproof sheet or film of regenerated cellulose, and securing said gummed material to said moistureproof sheet or film of regenerated cellulose.

21. A method of affixing a gummed material to a moistureproof material which comprises applying to at least one of the materials to be united a solution which will render the adhesive on the gummed material tacky and modify the surface of the moistureproof material, and securing said gummed material to said moistureproof material.

22. A method of affixing a gummed material to a moistureproof sheet or film of regenerated cellulose which comprises applying to at least one of the materials to be united a material which will render the adhesive on the gummed material tacky and modify the surface of the moistureproof sheet or film of regenerated cellulose, and securing said gummed material to said moistureproof sheet or film of regenerated cellulose.

In testimony whereof, I have affixed my signature to this specification.

JAMES E. SNYDER.